No. 719,113. PATENTED JAN. 27, 1903.
L. HIRT.
PROCESS OF MAKING WHITE SUGAR FROM BEETS.
APPLICATION FILED NOV. 18, 1899.
NO MODEL.
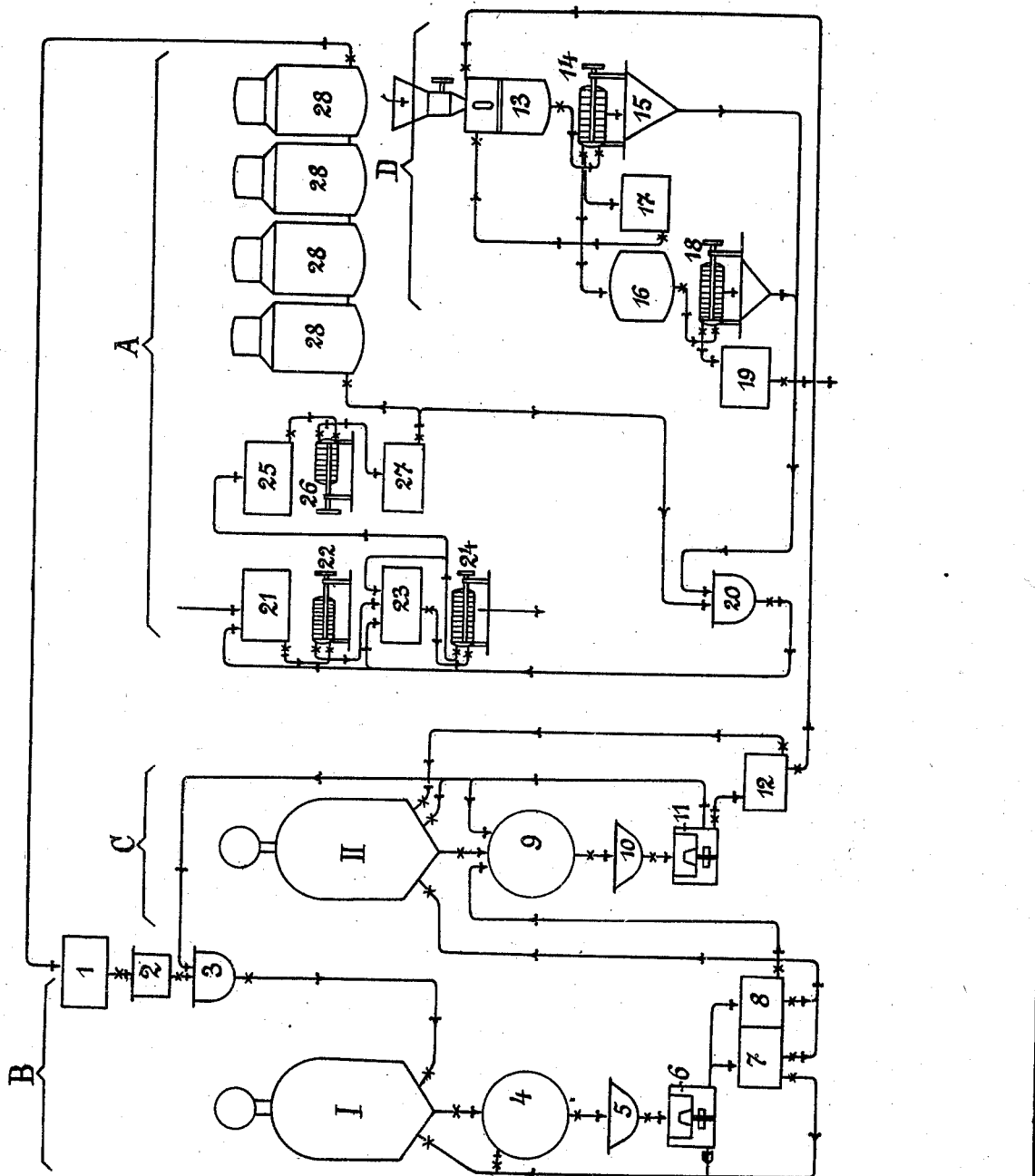
Witnesses
Inventor
Ludwig Hirt
By Briesen & Knauth
his Attorneys

UNITED STATES PATENT OFFICE.

LUDWIG HIRT, OF GREVENBROICH, GERMANY, ASSIGNOR TO MASCHINEN-FABRIK GREVENBROICH, OF GREVENBROICH, GERMANY, A CORPORATION.

PROCESS OF MAKING WHITE SUGAR FROM BEETS.

SPECIFICATION forming part of Letters Patent No. 719,113, dated January 27, 1903.

Application filed November 18, 1899. Serial No. 737,394. (No specimens.)

*To all whom it may concern:*

Be it known that I, LUDWIG HIRT, a subject of the King of Prussia, Emperor of Germany, and a resident of Grevenbroich, in the Kingdom of Prussia, Empire of Germany, have invented certain new and useful Improvements in the Manufacture of White Sugar from Beets, of which the following is a specification.

My invention relates to a process for manufacturing white sugar from beets. This process has for its object to so carry out the manufacture of the sugar that only two final products are obtained—namely, pure white sugar and a desucrized waste residue. For this purpose the sugar which is contained in the first molasses of the masse-cuite and in the final molasses, (by the term "final molasses" I mean a syrup of such low purity that by ordinary processes no more crystallizable sugar can be extracted therefrom,) as well as in the medium employed for washing, (clairce,) is constantly brought back to the original juice, so as to finally turn out the entire amount of crystallizable sugar as white sugar.

In carrying out my process I convey a portion of the first molasses obtained in purging the crystals first produced to the next strike of the first vacuum-pan, so as to again subject the sugar contained in the first molasses to the process of boiling and crystallization. The remainder of the first molasses, together with the clairce, is boiled to masse-cuite in a second vacuum-pan, thus producing final molasses and "seconds" sugar. This sugar is added to the first juice on its way to the first vacuum-pan, so that it will be dissolved in said juice. It will thus be seen that I bring into the first vacuum-pan not only the first juice and a portion of the first molasses, but also the entire amount of the seconds sugar, (in a dissolved condition,) and the addition of these two substances—viz., the first molasses and the seconds sugar—is an important feature of my process, since the addition of only one of them would not yield a thoroughly satisfactory result, for the reason that it would detrimentally affect the sugar proportion of the mixture or syrup boiled in the first vacuum-pan. It will thus be understood that the entire amount of crystallizable sugar is finally obtained as first sugar or pure white sugar from the first vacuum-pan. The final molasses which still contains sugar may be treated so as to produce trisucrate of lime, which may be added to the original thin or raw juice before the same is concentrated to be conveyed to the vacuum-pan. In this manner I may save practically the entire amount of sugar contained in the raw juice, and the operation is a continuous one, thus affording a very high economy in working.

I will now proceed to describe the improved process in detail, referring to the accompanying drawing, which is a diagrammatic view of an apparatus for carrying out my invention. This apparatus comprises four groups of appliances—first, a group of apparatus (lettered A) for transforming the raw juice into concentrated juice; second, a group of apparatus (lettered B) for transforming the concentrated juice into white sugar and collecting the first molasses and the clairce; third, a group of apparatus (lettered C) for transforming the clairce and first molasses into seconds sugar and final molasses; fourth, a group of apparatus (lettered D) for transforming the final molasses into trisucrate of lime.

The raw juice is supplied to the defecation and separation tanks 21, 23, and 25, in which it is subjected to the process of defecation and carbonation, for which purpose carbonic-acid gas may be introduced into the vessels or tanks 21 23 and sulfurous-acid gas into the tank 25.

27 is a collecting vessel into which the defecated juice is conducted, and 22, 24, and 26 indicate filter-presses intermediate between the tanks 21, 23, 25, and 27, so that the liquid discharged from the collecting vessel 27 is a defecated and therefore clear juice. This juice is conveyed to the evaporating-pans 28 to be concentrated therein and finally passes to the first vacuum-pan I through the collecting vessel 1, a filter 2, and a mixer 3. A portion of the clear juice is not evaporated or concentrated directly, but is employed for admixture to the trisucrate in a mixer 20, as will be described hereinafter.

The concentrated juice in the vacuum-pan I is boiled to masse-cuite, which is then discharged into the crystallizer 4 and there subjected to the process of crystallization in motion. This step having been completed, the mass is conveyed through the tank 5 into a centrifugal machine 6. Here I obtain three products—namely, pure white sugar, (first product,) first molasses, and after purging the latter clairce. The first molasses is collected in a tank 7 and the clairce in a tank 8, while the sugar is discharged as the final product. A portion of the first molasses is drawn from the tank 7 into the vacuum-pan I to be mixed therein with the masse-cuite formed from the original concentrated juice. The remainder of the first molasses, together with the clairce from the tank 8, is drawn into a second vacuum-pan II and is there boiled into masse-cuite. This masse-cuite is then subjected to crystallization in motion in the crystallizing apparatus 9 and passes through the vessel 10 to a centrifugal machine 11. Here the crystallizable sugar of inferior quality (seconds sugar) is separated from the uncrystallizable or final molasses. The seconds sugar is taken in solid or dissolved form to the reservoir or mixer 3, so as to be added therein to the concentrated juice on its way to the vacuum-pan I. By taking the sugar of inferior quality back to the initial stage of boiling a considerable increase in the purity of the concentrated juice is obtained, and this inferior grade of sugar is later on recovered by purging in the centrifugal machine 6 as white sugar of first quality. I desire again to call attention to the fact that I add to the original concentrated juice not only the seconds sugar, but a portion of the first molasses, (after this juice and the seconds sugar have reached the vacuum-pan,) and this is very important, for the reason that if the seconds sugar alone were added too high a degree of concentration would result, while with the procedure described it is possible to recover practically the entire amount of sugar.

As a result of the process so far described only white sugar (discharged from the centrifugal machine 6) and uncrystallizable final molasses which is collected in the vessel 12 are obtained.

I have also shown connections whereby a portion of the first molasses may be led directly to the crystallizing vessel 4, a portion of the clairce from tank 8 to the second crystrallizing vessel 9, a portion of the seconds sugar to the second crystallizing vessel 9 and to the second vacuum-pan II, and a portion of the final molasses to the second vacuum-pan II. These connections are not absolutely essential, but may be useful for the purpose of bringing the various liquids to the desired degree of concentration.

The final molasses, or at least the bulk of it, is taken from the tank 12 to the mixer 13, which is provided with a cooling device and the object of which is to convert the sugar contents of the final molasses into trisucrate of lime. For this purpose quicklime is added to the final molasses in the mixer 13, and the resulting product, which is readily decomposable trisucrate of lime with a mother-lye, is passed through a filter 14, separating the decomposable trisucrate of lime, which upon opening the filter runs through a funnel 15 to a suitable pipe connected with the mixer 20. The mother-lye run off from the filter 14 is collected in a vessel 16, into which is also run a portion of the washing liquid, with which the residuum in the filter 14 is treated after the separation of the trisucrate. The remainder of this washing liquid is run into the vessel 17, from which it passes to the mixer 13 and there serves to dilute the final molasses. That portion of the washing liquid which is collected in the vessel 16 is heated, whereby a permanent trisucrate of lime is precipitated, which is recovered by separation from its mother-lye in the filter-press 18, while the waste lye, being a desucrized liquid, goes into a tank 19 and may be run off. The permanent trisucrate, together with the decomposable trisucrate from the filter-press 14, is conveyed to the mixer 20, which, as before stated, also receives a portion of purified juice from the collecting-tank 27. In this mixing-tank monosucrate of lime is formed; but I desire to state that only readily-decomposable trisucrate is transformed into monosucrate at this point. The mixture of monosucrate and trisucrate with the juice passes to the defecation-pan 21. A portion of the material from the mixer 20 is also led directly to the pan 23, so as to be mixed with juice which has been subjected to one defecation and filtration. This mixture, led directly to the pan 23, will serve as an auxiliary medium for continuing the purifying of the juice. What I have termed the "decomposable trisucrate" (from filter 14) is converted into monosucrate and hydrate of lime in the mixer 20, and the hydrate of lime acts on the impurities of the juice in the well-known manner. What I have termed the "permanent" or "stable" trisucrate passes through the mixer 20 unaltered, but is decomposed in the defecation-tank 21 into monosucrate and hydrate of lime. Owing to the presence of carbonic acid, the monosucrate is decomposed, forming sugar-juice or saccharine liquor and carbonate of lime. The hydrate of lime and carbonate of lime are removed by the filters 22 24 26, while the saccharine liquor is carried along with the juice through the evaporation-pans 28, and thus finally reaches the vacuum-pan I. In this manner the entire sugar contents of the final molasses collected in the vessel 12 is again taken up into the process continuously by being submitted jointly with the raw beet-juice to the process of defecation and filtration. It will therefore be seen that the process is continuous and that only the following final products are obtained: first, pure white sugar of first quality at the centrifugal machine 6; second, waste lye from the tank 19, and, third, the impurities precipitated by hydrate of lime at the filters 22, 24, and 26.

I claim as my invention—

1. The process of manufacturing a single quality of white sugar, which consists in the following continuous cycle of operations: producing a concentrated beet-juice, boiling the same to masse-cuite, crystallizing and purging the masse-cuite, collecting the first molasses, boiling the same to produce seconds masse-cuite, crystallizing and purging the latter to produce seconds sugar and final molasses, adding the seconds sugar to the concentrated beet-juice and a portion of the first molasses to the first masse-cuite, producing trisucrate of lime from the final molasses, converting the trisucrate into monosucrate, and causing the hydrate of lime produced by the decomposition of the trisucrate to act on the raw beet-juice.

2. The process of manufacturing sugar, which consists in boiling a concentrated juice to masse-cuite, separating the sugar of said masse-cuite from the molasses, boiling the said molasses to produce seconds masse-cuite, subjecting the seconds masse-cuite to crystallization so as to produce therefrom seconds sugar and seconds molasses, and adding seconds sugar to the concentrated beet-juice, and a portion of the first molasses to the first masse-cuite.

3. The herein-described process of producing only one quality of white sugar, which consists in boiling concentrated juice, enriched with dissolved sugar from a previous strike, the said boiling taking place in a vacuum and being continued until a masse-cuite is produced, in the meantime drawing into the vacuum-pan first molasses after the introduction of the concentrated juice, subjecting said masse-cuite to crystallization in motion, purging the crystallized mass for the production of white sugar, separately collecting the first molasses and the clairce, conducting a portion of the first molasses to the first masse-cuite, boiling the remainder of the first molasses and the clairce to seconds masse-cuite, subjecting the latter to crystallization in motion and purging whereby sugar of an inferior quality is produced and an uncrystallizable molasses, returning said sugar to the first masse-cuite, transforming the uncrystallizable molasses into trisucrate of lime, converting said trisucrate into monosucrate, and admixing the latter to the concentrated juice.

In testimony that I claim the foregoing as my invention I have signed my name, in presence of two witnesses, this 30th day of October, 1899.

LUDWIG HIRT.

Witnesses:
  WM. ESSENWEIN,
  GEO. P. PETTIT.